(12) United States Patent
Atwood et al.

(10) Patent No.: US 6,451,440 B2
(45) Date of Patent: Sep. 17, 2002

(54) ROOM TEMPERATURE CURABLE SILICONE SEALANT

(75) Inventors: Robert C. Atwood, Mechanicville, NY (US); Chiu-Sing Lin, Rocky Hill, CT (US); Gary M. Lucas, Glenville, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/766,507

(22) Filed: Jan. 19, 2001

Related U.S. Application Data

(60) Provisional application No. 60/176,823, filed on Jan. 19, 2000.

(51) Int. Cl.⁷ .............................. B32B 9/04; C08K 5/01; C08L 83/04
(52) U.S. Cl. .................. 428/448; 428/447; 524/490; 524/588; 524/863; 528/901; 277/590
(58) Field of Search .................................. 428/446, 447, 428/448; 528/901; 524/490, 588, 863; 277/590

(56) References Cited

U.S. PATENT DOCUMENTS

| 4,144,216 | A |   | 3/1979  | Clark et al. |
| 4,164,617 | A |   | 8/1979  | Van Kesteren |
| 4,529,749 | A | * | 7/1985  | Favre et al. ................. 523/122 |
| 5,162,407 | A | * | 11/1992 | Turner ..................... 428/319.3 |
| 5,217,651 | A |   | 6/1993  | Hisayuki |
| 5,714,563 | A | * | 2/1998  | DePompei et al. ......... 524/705 |
| 5,863,976 | A |   | 1/1999  | Schneider |
| 6,306,999 | B1| * | 10/2001 | Ozai et al. .................. 428/447 |

FOREIGN PATENT DOCUMENTS

| EP | 0 839 870 A | 5/1998 |
| WO | WO 91 13945 A | 9/1991 |
| WO | 2 283 185 A | 5/1995 |

* cited by examiner

*Primary Examiner*—Robert Dawson
*Assistant Examiner*—Michael J Feely

(57) ABSTRACT

A silicone sealant composition containing: (a) a moisture curable organopolysiloxane component, comprising a mixture or reaction product of (i) an organopolysiloxane polymer having hydrolyzable substituent groups and (ii) a polyfunctional silicon compound having two or more hydrolyzable substituent groups, (b) a filler and (c) a hydrocarbon fluid comprising, based on 100 parts by weight of the hydrocarbon fluid, greater than 40 parts by weight cyclic paraffinic hydrocarbons and less than 60 parts by weight noncyclic paraffinic hydrocarbons, exhibits improved tensile, elongation and adhesive properties.

30 Claims, No Drawings

ROOM TEMPERATURE CURABLE SILICONE SEALANT

CROSS-REFERENCE TO RELATED APPLICATIONS

This application claims priority to U.S. application Ser. No. 60/176,823, filed Jan. 19, 2000, which is incorporated by reference in its entirety.

FIELD OF THE INVENTION

This invention relates to one part, room temperature vulcanizable silicone sealants, and in particular to such sealants having both improved flowability and improved properties upon cure.

BRIEF DESCRIPTION OF THE RELATED ART

Silicone compositions that are storable under dry conditions and which, on exposure to moisture, cure to produce elastomers, are widely used as sealants and caulks in building and construction applications. These compositions are often referred to as one part, room temperature vulcanizable ("RTV") compositions. They typically contain a moisture-curable polyorganosiloxane polymer, a filler, and a condensation cure catalyst. When used as sealants, they are typically packaged in a moisture impervious tube and applied to a substrate by extrusion from the packaging tube.

One approach to improving the performance properties of the elastomer formed from the sealant composition is to increase the amount of filler contained in the composition. However, increasing the filler content of the sealant composition also increases the viscosity of the composition, leading to difficulties in extrusion from the packaging. There accordingly remains a need in the art for a sealant composition having a viscosity that is sufficiently low to enable extrusion of the composition, but which does not at the same time limit the amount of filler that can be added to the composition.

SUMMARY OF THE INVENTION

The present invention relates to a curable silicone sealant composition comprising
- a one-part, moisture-curable polysiloxane component comprising a mixture or reaction product of (i) a polysiloxane polymer having hydrolyzable substituent groups and (ii) a polyfunctional silicon compound having two or more hydrolyzable substituent groups,
- a filler, and
- a hydrocarbon fluid comprising, based on 100 parts by weight of the hydrocarbon fluid, greater than 40 parts by weight cyclic paraffinic hydrocarbons and less than 60 parts by weight noncyclic paraffinic hydrocarbons.

The composition is readily extrudable, and yet upon cure, exhibits improved tensile, elongation, and adhesive properties.

DETAILED DESCRIPTION OF THE INVENTION

In a preferred embodiment, the moisture-curable silicone sealant comprises, based on 100 parts by weight ("pbw") of the sealant composition, from 20 pbw to 90 pbw, more preferably from 30 pbw to 75 pbw, even more preferably from 40 pbw to 60 pbw, of the moisture-curable organopolysiloxane polymer, from 1 pbw to 80 pbw, more preferably from 2 pbw to 78 pbw, even more preferably from 3 pbw to 65 pbw, of the filler, and from 1 pbw to 50 pbw, more preferably from 10 pbw to 40 pbw, even more preferably from 15 pbw to 35 pbw, of the hydrocarbon fluid.

The moisture-curable polysiloxane component comprises a mixture or reaction product of (i) a polysiloxane polymer having hydrolyzable substituent groups and (ii) a polyfunctional silicon compound having two or more hydrolyzable substituent groups. Suitable functional polysiloxanes comprises one or more silicone polymers or copolymers having structural units according to structural formula (I):

$$R_a SiO_{4-a/2} \qquad (I)$$

wherein each R is independently hydroxy, a hydrolyzable organic group, or a monovalent hydrocarbon radical, $0 \leq a \leq 4$, and at least one R group per molecule is hydroxy or a hydrolyzable organic group, more preferably a hydroxy group.

Suitable hydrolyzable organic groups are those organic groups, for example, alkoxy, oximo, amino, aminoxy or acyloxy groups, that are capable of reacting under room temperature vulcanization conditions in the presence of moisture and a condensation cure catalyst to thereby allow moisture curing of the sealant composition.

Suitable monovalent hydrocarbon radicals include monovalent acyclic hydrocarbon radicals, monovalent alicyclic hydrocarbon radicals, and monovalent aromatic hydrocarbon radicals.

As used herein, the term "monovalent acyclic hydrocarbon radical" means a monovalent straight or branched chain hydrocarbon radical, preferably containing from 1 to 20 carbon atoms per radical, which may be saturated or unsaturated and which may, optionally, be substituted, for example with one or more halo groups. Suitable monovalent acyclic hydrocarbon radicals include, for example, alkyl radicals, for example, methyl, ethyl, sec-butyl, tert-butyl, octyl, dodecyl, stearyl and eicosyl, haloalkyl, such as trifluoropropyl, alkenyl radicals, for example, ethenyl and propenyl, and alkynyl radicals, such as, for example, propynyl and butynyl.

As used herein, the term "alicyclic hydrocarbon radical" means a radical containing one or more saturated hydrocarbon rings, preferably containing from 6 to 10 carbon atoms per ring, per radical which may optionally be substituted on one or more of the rings with one or more alkyl groups, each preferably containing from 2 to 6 carbon atoms per group and which, in the case of two or more rings, may be fused rings. Suitable monovalent alicyclic hydrocarbon radicals include, for example, cyclohexyl and cyclooctyl.

As used herein, the term "monocyclic aromatic hydrocarbon radical" means a hydrocarbon radical containing one aromatic ring per radical, which may optionally be substituted on the aromatic ring with one or more alkyl groups, each preferably containing from 2 to 6 carbon atoms per group. Suitable monovalent aromatic hydrocarbon radicals include, for example, phenyl, tolyl, xylyl, 2,4,6-trimethylphenyl, and naphthyl.

In one preferred embodiment, the polysiloxane polymer comprises a mixture of two or more linear polymers or copolymers having the structural formula (II):

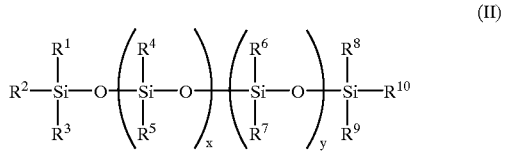

(II)

wherein each $R^1$, $R^2$, $R^3$, $R^4$, $R^5$, $R^6$, $R^7$, $R^8$, $R^9$, and $R^{10}$ is independently a hydrolyzable organic group or a monovalent hydrocarbon radical, at least one of $R^1$, $R^2$, $R^3$, $R^4$, $R^5$, $R^6$, $R^8$, $R^9$ and $R^{10}$ per molecule is hydroxy, or at least two of $R^1$, $R^2$, $R^3$, $R^4$, $R^5$, $R^6$, $R^7$, $R^8$, $R^9$ and $R^{10}$ per molecule are hydrolyzable organic groups, and x and y are each numbers selected to provide a polymer that exhibits a viscosity of from 5,000 to 500,000 centiPoise ("cp") at 25° C.

In a preferred embodiment, each $R^1$, $R^3$, $R^4$, $R^5$, $R^6$, $R^7$, $R^8$ and $R^9$ is independently $(C_1-C_8)$alkyl, fluoroalkyl or phenyl and each $R^2$ and $R^{10}$ is hydroxyl, $(C_1-C_8)$alkyl, fluoroalkyl or phenyl.

Suitable polyfunctional organosilicone compounds are those that contain at least two hydrolyzable groups per molecule. Suitable polyfunctional organosilicone compounds can be silanes or partially hydrolyzed products of silanes and include, for example, vinyltrimethoxysilane, tetramethoxysilane, methyltriethoxysilane, tetraethoxysilane, methyltrimethoxysilane, methylphenyldiethoxysilane, 3,3,3-trifluoropropyltrimethoxysilane, methyl(tri(methylethylketoximo)silane, ethyl(tri(N,N-diethylamino)silane, methyltriacetoxysilane, ethyltriacetoxysilane, methyltri(N-methylacetamido)silane, n-propylorthosilicate and ethylpolysilicate, as well as dimers and trimers of such compounds.

In a preferred embodiment, the polyfunctional organosilicone compound has the structural formula (III):

(III)

wherein each $R^{11}$ is independently a hydrolyzable group or a monovalent hydrocarbon radical, provided that at least one $R^{11}$ is H, alkoxy or alkenyl and that at least two $R^{11}$ groups are hydrolyzable groups.

In one preferred embodiment, at least three $R^{11}$ substituents are each alkoxy, oximo, amino, aminoxy or acyloxy, more preferably alkoxy or acyloxy, even more preferably $(C_1-C_8)$alkoxy or $(C_1-C_8)$acyloxy, and the remaining $R^{11}$ substituent, if any, is $(C_1-C_8)$alkyl, $(C_2-C_8)$alkenyl, aryl or fluoroalkyl. Preferred polyfunctional organosilicone compounds include, for example, vinyltrimethoxysilane, tetramethoxysilane, methyltriethoxysilane, methyltriacetoxysilane, ethyltriacetoxysilane, tetraethoxysilane, methyltrimethoxysilane, di-t-butoxydiacetoxysilane, or mixtures thereof.

The relative quantities of each of the silicone-containing components is readily determined by one of ordinary skill in the art. In general, the moisture curable organopolysiloxane polymer is made by reaction of 100 pbw of the organopolysiloxane polymer with from about 0.1 to about 15 pbw, more preferably from about 1.0 to about 10 pbw, and most preferably from about 2 to about 7 pbw of the polyfunctional organosilicone compound.

It is believed that at least some moisture curable organopolysiloxane polymer is formed during compounding of the composition of the present invention by in situ condensation reaction of the organopolysiloxane polymer with the polyfunctional organosilicone compound.

The composition may, optionally, further comprise a condensation cure catalyst. Suitable condensation cure catalysts are those that, in the presence of moisture, catalyze the room temperature crosslinking of the crosslinkable organopolysiloxane polymer and include, for example, dialkyltincarboxylates, such as, for example, dibutyl tin dilaurate, dibutyl tin diacetate, and tin-2-ethylhexanoate, alkyl titanates, such as for example, tetrabutyl tin titanate, tetra-n-propyl titanate, and organosiloxy titanium compounds. Various other condensation catalysts are known in the art.

Where the polyfunctional organosilicone compound comprises acyloxy substituent groups, the composition comprises, based on 100 pbw of the composition, from 0 to 1 pbw, more preferably from 0.01 to 0.5 pbw of a dialkyl tin carboxylate condensation cure catalyst.

Where the polyfunctional organosilicone compound comprises hydrolyzable organic groups other than acyloxy groups, the composition comprises, based on 100 pbw of the composition, from 0.01 to 10 pbw, more preferably from 0.1 to 7 pbw and, even more preferably, from 1 pbw to 5 pbw of an alkyl titanate or organosiloxy titanium compound condensation cure catalyst.

Where the polyfunctional organosilicon compound comprises hydrolyzable organic groups other than acyloxy groups, the composition comprises, based on 100 pbw of the composition, from 0.01 to 5 pbw, preferably from 0.05 to 2 pbw, more preferably from 0.1 to 0.3 pbw of a dialkyl tin carboxylate condensation cure catalyst.

The hydrocarbon fluid typically comprises one or more cyclic hydrocarbons containing from 5 to 24 carbon atoms per molecule and, optionally, one or more non-cyclic paraffinic hydrocarbons containing from 5 to 24 carbon atoms per molecule. In a preferred embodiment, the cyclic and non-cyclic hydrocarbons of the hydrocarbon fluid each contain from 8 to 20, more preferably, from 10 to 15 carbon atoms per molecule. Suitable cyclic paraffinic hydrocarbons include, for example, cyclohexane, cyclooctane, cyclononane, cyclodecane, and cyclododecane. Suitable noncyclic paraffinic hydrocarbons include, for example, n-heptane, n-hexane, n-octane, iso-octane, n-nonane, n-decane, n-undecane, n-dodecane, iso-dodecane, n-heptadecane, n-octadecane, n-eicosane, isoeicosane. In a preferred embodiment, the hydrocarbon fluid comprises less than about 0.5 percent by weight aromatic hydrocarbons.

In a preferred embodiment, the hydrocarbon fluid comprises, based on 100 pbw of the hydrocarbon fluid, from about 42 pbw to 100 pbw, more preferably from about 45 pbw to 75 pbw, still more preferably from about 50 pbw to 70 pbw, and even more preferably from about 55 pbw to 65 pbw cyclic paraffinic hydrocarbons and from 0 pbw to about 58 pbw, more preferably from about 25 pbw to 55 pbw, and still more preferably from about 30 pbw to 50 pbw and even more preferably from about 30 pbw to 45 pbw noncyclic, that is, linear or branched, paraffinic hydrocarbons. In a preferred embodiment, the hydrocarbon fluid comprises less than 15, more preferably less than 10 pbw normal, that is, linear paraffinic hydrocarbons.

The filler component is generally a reinforcing filler, a semi-reinforcing filler, a non-reinforcing filler, or a mixture thereof. Preferably, the filler is of the reinforcing type, for example, fumed silica, hydrophobicized fumed silica, carbon black, titanium dioxide, ferric oxide, aluminum oxide, as well as other metal oxides. These fillers are commercially available from a number of sources. Fumed silica is preferred. The curable, silicone sealant composition may comprise, based on 100 parts by weight of the sealant composition, from 1 pbw to 20 pbw, more preferably from 5 pbw to 15 pbw, of a reinforcing filler.

The filler used in the curable sealant composition may, optionally, further comprise semi-reinforcing or non-reinforcing fillers. Suitable semi-reinforcing or non-reinforcing fillers include, for example, quartz, precipitated silica, hydrophobicized precipitated silica, and calcium carbonate, which are commercially available from a number of sources. In a preferred embodiment, the semi-reinforcing or non-reinforcing filler comprises calcium carbonate. When present, the silicone sealant composition comprises, based on 100 parts by weight of the sealant composition, from 0 pbw to 70 pbw, more preferably from 30 pbw to 60 pbw, even more preferably from 40 pbw to 60 pbw, of a semi-reinforcing filler, a non-reinforcing filler or a mixture thereof.

The curable silicone sealant composition may, optionally, further comprise other known components, for example dyes, pigments, anti-oxidants, UV stabilizers, adhesion-enhancing agents, thermal stabilizing agents such as aluminum stearate, biocides, non-silicone polymers, and thixotropic additives such as polyethylene glycol or polypropylene glycol.

The curable sealant composition is made by combining and mixing the various components of the composition. The mixing may be conducted as a batch process or as a continuous process and any convenient mixing apparatus, such as a planetary mixer, may be used to mix the components. In a preferred embodiment, the composition is made by continuously compounding the composition in an extruder, preferably a twin screw extruder.

In use, the composition is exposed, for example by extrusion, to ambient moisture, and allowed to cure. Preferably, the composition is maintained in moisture-impervious packaging up until the time of use. In a preferred embodiment, the composition is used to seal a gap between a first substrate and a second substrate, wherein the second substrate is spaced apart from the first substrate to form a gap, by applying an amount of the composition effective to bridge the gap and allowing the composition to cure in place to form an elastomeric seal between the substrates.

A further embodiment is an assembly, comprising a first substrate, a second substrate spaced apart from the first substrate, and a cured silicone sealant composition described above disposed between the first and second substrates and bonded to each of the substrates.

The invention is further illustrated by the following non-limiting example.

EXAMPLE

The sealant composition of the Example was an acetoxy sealant comprising 67.2 percent by weight ("wt %") of a hydroxy-terminated poly(dimethylsiloxane) polymer, 20 wt % of a hydrocarbon fluid, 9 wt % untreated fumed silica, 3.5 wt % of catalyst solution and 0.3 wt % other additives. The catalyst solution silane contained acetoxy-functional silane crosslinking agents and a condensation cure catalyst. The hydrocarbon fluid (Conosol™ C-200 hydrocarbon fluid) had a nominal composition of about 60 wt % cycloparaffinic hydrocarbons, from 5 to 6 wt % n-paraffinic hydrocarbons, with the remainder being iso-paraffinic hydrocarbons, and exhibited an aromatic content of less than about 0.5 wt %. The sealant composition was tested for physical properties after curing for 7 days at 75° C. and 50% relative humidity. The ASTM test methods used and test results are listed in the Tables below.

| Property | ASTM test # | Result |
|---|---|---|
| Application rate (grams/minute) | C1183 | 400 |
| Tack free time (minutes) | C679 | 31 |
| Boeing flow (inches) | D2202 | 0.1 |
| Shore A hardness | C661 | 23 |
| Tensile strength (pounds per square inch) | D412 | 310 |
| % Elongation | D412 | 517 |

Heat aged properties, 24 hr at 100° C.

| Property | ASTM test # | Result |
|---|---|---|
| Shore A | C661 | 23 |
| Tensile strength (pounds per square inch) | D412 | 270 |
| % Elongation | D412 | 516 |

Peel Adhesion Properties, ASTM C628

| | |
|---|---|
| Glass (pounds pull) | 26 |
| % Cohesive failure | 97 |

Lap Shear Properties, ASTM E62

| | |
|---|---|
| Alclad Aluminum (pounds pull) | 120 |
| % Cohesive failure | 98 |

As may be seen by reference to the above data, the curable composition has excellent physical properties.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A curable silicone sealant composition comprising:
   a one-part, moisture-curable polysiloxane component comprising a mixture or reaction production of (i) a polysiloxane polymer having hydrolyzable substituent groups and (ii) a polyfunctional silicon compound having two or more hydrolyzable substituent groups,
   a filler, and
   a hydrocarbon fluid comprising, based on 100 parts by weight of the hydrocarbon fluid, about 45 about 75 parts by weight cyclic paraffinic hydrocarbons having from 5 to 24 carbon atoms per molecule, and about 25 to about 55 parts by weight noncyclic paraffinic hydrocarbons having from 5 to 24 carbon atoms per molecule.

2. The curable silicone sealant composition of claim 1, comprising, based on 100 parts by weight of the sealant composition, from 20 pbw to 90 pbw of the moisture-curable polysiloxane component, from 1 pbw to 80 pbw of the filler, and from 1 pbw to 50 pbw of the hydrocarbon fluid.

3. The curable silicone sealant composition of claim 1, compromising, based on 100 parts by weight of the sealant composition, from 30 pbw to 75 pbw of the moisture-curable polysiloxane component, from 2 pbw to 78 pbw of the filler, and from 10 pbw to 40 pbw of the hydrocarbon fluid.

4. The curable silicone sealant composition of claim 1, comprising, based on 100 parts by weight of the sealant composition, from 40 pbw to 60 pbw of the moisture-curable polysiloxane component, from 3 pbw to 65 pbw of the filler, and from 15 pbw to 35 pbw of the hydrocarbon fluid.

5. The curable silicone sealant composition of claim 1, wherein the polysiloxane polymer comprises one or more silicone polymers or copolymers having structural units according to structural formula (I);

$$R_{11}SiO_{4-a/2} \quad (I)$$

wherein each R is inependently hydroxy, a hydrolyzable organic group, or a monovalent hydrocarbon radical; $0 \leq a \leq 4$; and at least one R group per molecule is hydroxy or a hydrolyzable organic group.

6. The curable silicone sealant composition of claim 5, wherein the hydrolyzable organic groups are alkoxy, oximo, amino, aminoxy, acyloxy, or a combination thereof.

7. The curable silicone sealant composition of claim 1, wherein the polysiloxane polymer comprises a mixture of two or more linear polymers or copolymers having the structural formula (II):

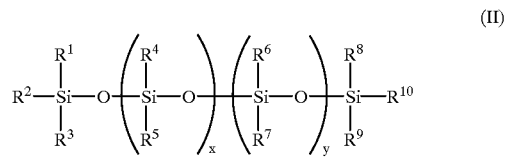

(II)

wherein each $R^1$, $R^2$, $R^3$, $R^4$, $R^5$, $R^6$, $R^7$, $R^8$, $R^9$, and $R^{10}$ is independently a hydrolyzable organic group or a monovalent hydrocarbon radical, at least one of $R^1$, $R^2$, $R^3$, $R^4$, $R^5$, $R^6$, $R^7$, $R^8$, $R^9$ and $R^{10}$ per molecule is hydroxy, or at least two of $R^1$, $R^2$, $R^3$, $R^4$, $R^5$, $R^6$, $R^7$, $R^8$, $R^9$ and $R^{10}$ per molecule are hydrolyzable organic groups, and x and y are each numbers selected to provide a polymer that exhibits a viscosity of from 5,000 to 500,000 centiPoise at 25° C.

8. The curable silicone sealant composition of claim 7, wherein each $R^1$, $R^3$, $R^4$, $R^5$, $R^6$, $R^7$, $R^8$ and $R^9$ is independently $(C_1-C_8)$alkyl, fluoroalkyl or phenyl; and each $R^2$ and $R^{10}$ is hydroxyl, $(C_1-C_8)$alkyl, fluoroalkyl or phenyl.

9. The curable silicone sealant composition of claim 1, wherein the polyfunctional silicon compound is vinyltrimethoxysilane, tetramethoxysilane, methyltriethoxysilane, tetraethoxysilane, methyltrimethoxysilane, methylphenyldiethoxysilane, 3,3,3-trifluoropropyltrimethoxysilane, methyltri(methylethylketoximo)silane, ethyltri(N,N-diethylamino)silane, methyltriacetoxysilane, ethyltriacetoxysilane, methyltri(N-methylacetamido)silane, n-propylorthosilicate and ethylpolysilicate, or dimers or trimers thereof.

10. The curable silicone sealant composition of claim 1, wherein the polyfunctional silicon compound has the structural formula (III):

$$R^{11}{}_4Si \quad (III)$$

wherein each $R^{11}$ is independently a hydrolyzable group or a monovalent hydrocarbon radical, provided that at least one $R^{11}$ is H, alkoxy or alkenyl and that at least two $R^{11}$ groups are hydrolyzable groups.

11. The curable silicone sealant composition of claim 10 wherein at least three $R^{11}$ substituents are each alkoxy, oximo, amino, aminoxy, or acyloxy.

12. The curable silicone sealant composition of claim 10, wherein at least three $R^{11}$ substituents are $(C_1-C_8)$alkoxy or $(C_1-C_8)$acyloxy, and any remaining $R^{11}$ substituent, is $(C_1-C_8)$alkyl, $(C_2-C_8)$alkenyl, aryl, or fluoroalkyl.

13. The curable silicone sealant composition of claim 10, wherein the polyfunctional silicon compound is vinyltrimethoxysilane, tetramethoxysilane, methyltriethoxysilane, methyltriacetoxysilane, ethyltriacetoxysilane, tetraethoxysilane, methyltrimethoxysilane, di-t-butoxydiacetoxysilane, or a mixture thereof.

14. The curable silicone sealant composition of claim 1, wherein the moisture-curable polysiloxane component is made by reaction of 100 parts by weight of the polysiloxane polymer with from about 0.1 to about 15 parts by weight of the polyfunctional silicon compound.

15. The curable silicone sealant composition of claim 1, wherein the moisture-curable polysiloxane component is made by reaction of 100 parts by weight of the polysiloxane polymer with from 1.0 to about 10 parts by weight of the polyfunctional silicon compound.

16. The curable silicone sealant composition of claim 1, wherein the moisture-curable polysiloxane component is made by reaction of 100 parts by weight of the polysiloxane polymer with from about 2 to about 7 parts by weight of the polyfunctional silicon compound.

17. The curable silicone sealant composition of claim 1, further comprising a condensation cure catalyst.

18. The curable silicone sealant composition of claim 1, wherein the cyclic and noncyclic hydrocarbons each contained from 8 to 20 carbon atoms per molecule.

19. The curable silicone sealant composition of claim 1, wherein the cyclic paraffinic hydrocarbon is cyclohexane, cyclooctane, cyclononane, cyclodecane, or cyclododecane, and the noncyclic paraffinic hydrocarbon is n-heptane, n-hexane, n-octane, iso-octane, n-nonane, n-decane, n-undecane, n-dodecane, iso-dodecane, n-heptadecane, n-octadecane, n-eicosane, or isoeicosane.

20. The curable silicone sealant composition of claim 1, wherein the hydrocarbon fluid comprises, based on 100 parts by weight of the hydrocarbon fluid, about 50 to about 70 parts by weight cyclic paraffinic hydrocarbons and about 30 to about 50 parts by weight noncyclic paraffinic hydrocarbons.

21. The curable silicone sealant composition of claim 1, wherein the hydrocarbon fluid comprises, based on 100 parts by weight of the hydrocarbon fluid, about 55 to about 65 parts by weight cyclic paraffinic hydrocarbons and about 33 to about 45 parts by weight noncyclic, paraffinic hydrocarbons.

22. The curable silicone sealant composition of claim 1, wherein the filler is a reinforcing filler.

23. The curable silicone sealant composition of claim 22, wherein the filler is fumed silica, hydrophobicized fumed silica, carbon black, titanium dioxide, ferric oxide, aluminum oxide, or a mixture thereof.

24. The curable silicone sealant composition of claim 22, wherein the filler is fumed silica in amount from 1 parts by weight to 20 parts by weight, based on 100 parts by weight of the total sealant composition.

25. The curable silicone sealant composition of claim 22, further comprising a semi-reinforcing or non-reinforcing filler.

26. The curable silicone sealant composition of claim 22, further comprising calcium carbonate.

27. A method for the manufacture of a one-part, room temperature curable sealant composition, comprising mixing a one-part, moisture-curable polysiloxane component comprising a mixture or reaction product of (i) a polysiloxane polymer having hydrolyzable substituent groups and (ii) a polyfunctional silicon compound having two or more hydrolyzable substituent groups, a filler, and a hydrocarbon fluid comprising, based on 100 parts by weight of the hydrocarbon fluid, about 45 to about 75 parts by weight cyclic paraffinic hydrocarbons having from 5 to 24 carbon atoms per molecule, and about 25 to about 55 parts by weight noncyclic paraffinic hydrocarbons having from 5 to 24 carbon atoms per molecule.

28. The method of claim 27, wherein mixing is by continuously compounding the composition in an extruder.

29. A method for sealing a gap between a first substrate and a second substarte, wherein the second substrate is spaced apart from the first substrate to form a gap, comprising applying an amount of a room temperature curable sealing composition comprising a one-part, moisture-curable polysiloxane component comprising a mixture or reaction product of (i) a polysiloxane polymer having hydrolyzable substituent groups and (ii) a polyfunctional silicon compound having two or more hydrolyzable substituent groups, a filler, and a hydrocarbon fluid comprising, based on 100 parts by weight of the hydrocarbon fluid, from about 45 parts by weight to 75 parts by weight cyclic paraffinic hydrocarbons having from 5 to 24 carbon atoms per molecule, and from about 25 parts by weight to 55 parts by weight noncyclic paraffinic hydrocarbons having from 5 to 24 carbon atoms per molecule in an amount effective to bridge the gap; and allowing the composition to cure in place to form an elastomeric seal between the substrates.

30. An assembly comprising a first substrate, a second substrate spaced apart from the first substrate, and a cured silicone sealant composition of claim 1.

* * * * *